Sept. 24, 1957 M. LIPARI 2,807,384
COMPARTMENTAL DISPENSING RECEPTACLE
Filed March 12, 1956 2 Sheets-Sheet 1
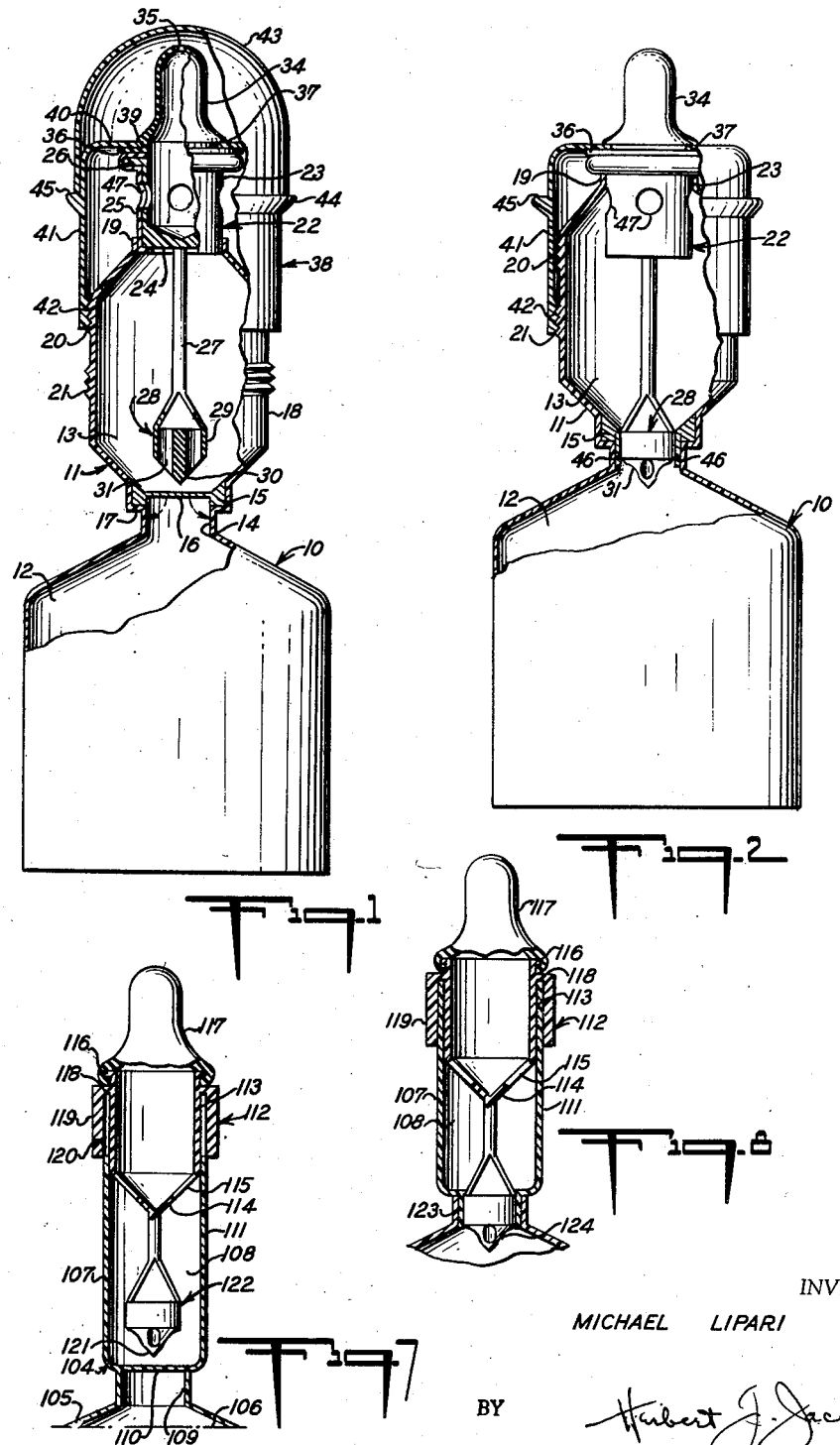
INVENTOR
MICHAEL LIPARI
ATTORNEY

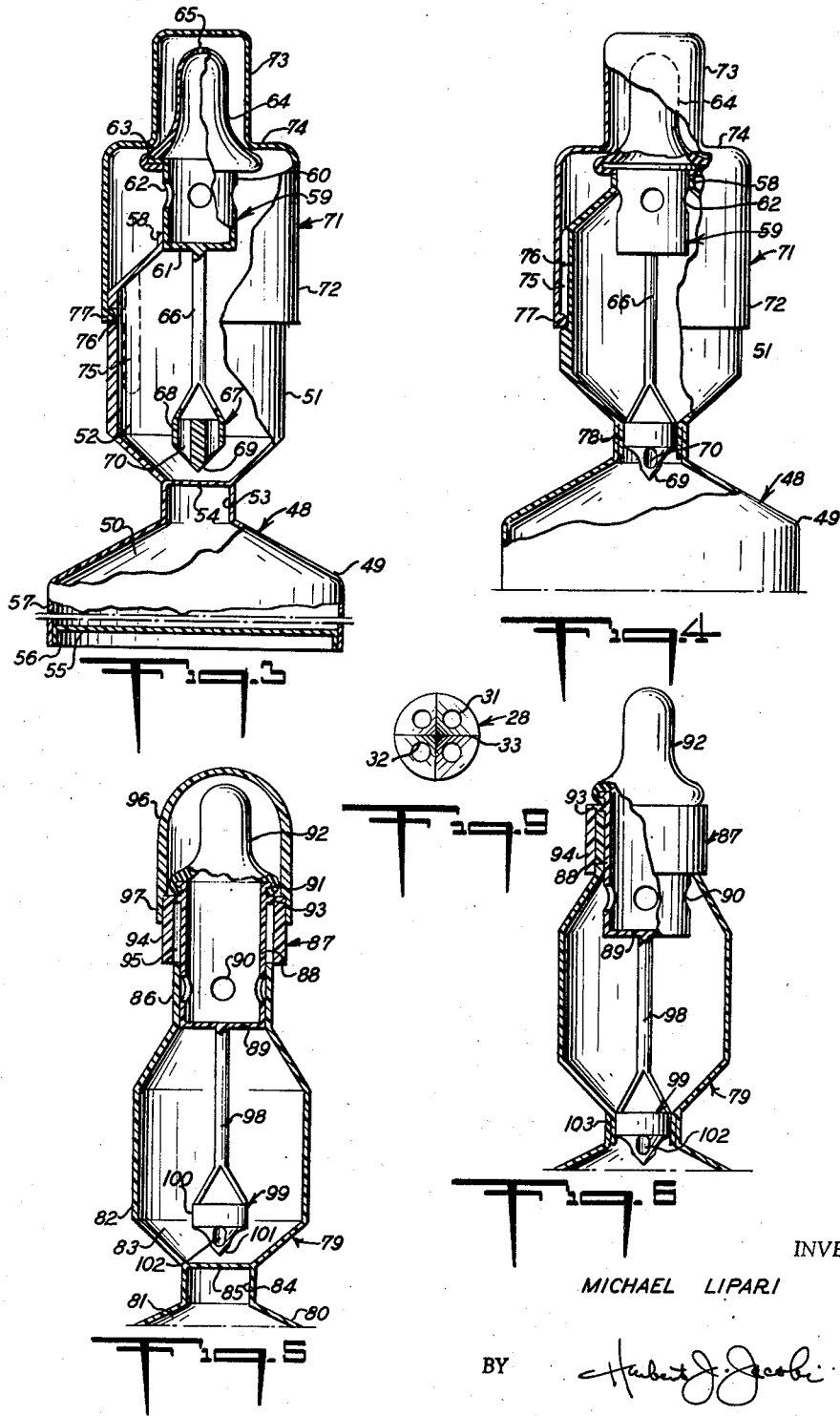

United States Patent Office 2,807,384
Patented Sept. 24, 1957

2,807,384

COMPARTMENTAL DISPENSING RECEPTACLE

Michael Lipari, Oneonta, N. Y.

Application March 12, 1956, Serial No. 570,906

20 Claims. (Cl. 215—11)

This invention relates to the storage and dispensing of materials and more particularly to a compartmental receptacle providing compartments in which ingredients of a mixture may be kept in separated condition and thereafter mixed within the receptacle and dispensed as desired.

This invention relates to the same subject matter as that disclosed and claimed in my co-pending application Serial Number 519,173, filed June 30, 1955. The invention disclosed and claimed in the instant application represents an improvement over that in the prior application identified above.

The compartmental dispensing receptacle of this invention is primarily intended to store infant's food in which milk in powdered or condensed form may be contained in one compartment and a suitable diluent may be contained in the other compartment. Means is provided for sealing a passage between the two compartments in order to prevent mixing of the contents thereof and there is also provided a dispensing nipple and means to rupture the seal between the two compartments in order to permit mixing of the contents and subsequent dispensing through the nipple.

Heretofore numerous compartmental receptacles of the same general nature as this invention have been proposed and utilized but many of these were inconvenient to use in that removable stoppers were utilized between the compartments of the receptacle and mixing of the contents required removal of such stopper by means of an elongated wire or flexible member and furthermore it was often necessary to remove some part of the receptacle in order to permit mixing and dispensing of the contents. Also in these prior art compartmental receptacles the stopper between the compartments often became dislodged thereby resulting in premature mixing of the contents with the result that the contents were not in proper condition for dispensing when desired. In utilizing the prior art compartmental receptacles in order to mix and dispense the contents it was necessary to perform several manipulative operations such as removing the stopper between the compartments, removing a closure at the dispensing opening in the receptacle and if the contents were to be used for infant feeding it was necessary to apply a nipple to the receptacle or transfer the materials to a conventional nursing bottle. The above features are all undesirable in a receptacle of this type and consequently any improvement which eliminates these undesirable features represents a material step forward in the art.

It is accordingly an object of this invention to provide a compartmental dispensing receptacle which may be economically and conveniently manufactured from readily available materials, and in which the entire device is completely self-contained and does not require the removal or addition of elements in order to carry out the complete mixing and dispensing operation.

A further object of the invention is the provision of a compartmental dispensing receptacle providing two compartments for receiving ingredients to be mixed and in which such compartments are separated by a rupturable diaphragm in order to provide adequate sealing between such compartments.

A still further object of the invention is the provision of a compartmental dispensing receptacle having two compartments separated by a rupturable diaphragm which diaphragm forms a part of a stopper which may be inserted after the lower compartment has been filled with material.

Another object of the invention is the provision of a compartmental dispensing receptacle having two compartments separated by a rupturable diaphragm and including a valve and stopper assembly for one of the compartments which assembly also includes a cutting head for rupturing the diaphragm upon downward movement of the assembly.

A further object of the invention is the provision of a compartmental dispensing receptacle having two compartments separated by a rupturable diaphragm and incorporating a valve and stopper assembly as well as a cutting means for rupturing the diaphragm upon downward movement of the assembly, such assembly also including as a permanent part thereof a dispensing nipple.

A still further object of the invention is the provision of a compartment dispensing receptacle having two compartments separated by a rupturable diaphragm and including a valve and stopper assembly and a diaphragm piercing head and in which means is also provided to prevent inadvertent movement of the assembly with consequent inadvertent rupturing of the diaphragm.

Another object of the invention is the provision of a compartmental dispensing receptacle having two compartments separated by a rupturable diaphragm and in which such diaphragm is formed as an integral part of the receptacle.

A further object of the invention is the provision of a compartmental dispensing receptacle having two compartments separated by a rupturable diaphragm, there being also provided a valve and stopper assembly together with a diaphragm piercing head which head is formed in such a manner as to form flaps in the diaphragm upon piercing thereof the head serving to hold such flaps in such a way as to provide a substantially unobstructed passage between the compartments of the receptacle.

A still further object of the invention is the provision of a compartmental dispensing receptacle having two compartments separated by a rupturable diaphragm and in which there is also provided a valve and stopper assembly together with a diaphragm piercing head and an actuating means for the assembly which actuating means serves to prevent inadvertent movement of such assembly and at the same time provide a protective cap for a dispensing nipple permanently secured to the assembly.

Another object of the invention is the provision of a compartmental dispensing receptacle having two compartments separated by a rupturable diaphragm and in which the upper compartment may be substantially cylindrical in form.

Further objects and advantages of the invention will be apparent from the following description taken in conjunction with the accompanying drawings wherein:

Fig. 1 is a side elevational view with parts in section for greater clarity and showing the receptacle prior to rupture of the diaphragm separating the two compartments;

Fig. 2, a view similar to Fig. 1, but showing the position of the parts after rupture of the diaphragm and preparatory to mixing and dispensing of the contents;

Fig. 3, a fragmentary side elevational view with parts in section for greater clarity and showing a modified form of the invention in which the rupturable diaphragm forms a permanent part of the receptacle, the lower compartment being filled through the bottom with the bottom wall subsequently sealed in place, there also being shown an actuator and nipple protecting cap for moving the parts to rupture the diaphragm and permit dispensing of the contents, the parts being shown prior to rupture of such diaphragm;

Fig. 4, a view similar to Fig. 3, and showing the parts in the position occupied after rupture of the diaphragm;

Fig. 5, a sectional view showing a further modified form of the invention with a different type of valve and stopper assembly as well as a different type of nipple protecting cap, this view also showing the parts prior to rupture of the diaphragm;

Fig. 6, a view similar to Fig. 5 and showing the position occupied by the parts after rupture of the diaphragm;

Fig. 7, a sectional view showing a still further modified form of the invention in which the upper container is substantially cylindrical and showing the parts in the position occupied prior to rupture of the diaphragm separating the compartments;

Fig. 8, a view similar to Fig. 7 and showing the position occupied by the parts after rupture of the diaphragm; and Fig. 9, a bottom plan view of the diaphragm piercing head.

With continued reference to the drawings and more particularly Figs. 1 and 2 there is shown a compartmental dispensing receptacle 10 constructed in accordance with this invention and which may well comprise a container 11 providing a lower compartment 12 and an upper compartment 13. A restricted passage connects the compartments 12 and 13 and such passage may normally be closed by a stopper 15 which includes a rupturable diaphragm 16. The stopper 15 and diaphragm 16 may be formed of suitable plastic or other material and after filling of the compartment 12 with a suitable diluent the stopper 15 and diaphragm 16 is placed in position as shown in Fig. 1 with the stopper 15 engaging a shoulder 17 provided in the wall of the container 11 to form a fluid tight seal between the compartments 12 and 13. The container 11 may be formed of glass, plastic or any other suitable material which may be conveniently molded or otherwise formed to the desired size and configuration.

The upper compartment 13 is formed by a side wall 18 which terminates at the upper end in a reduced cylindrical wall 19 providing a neck portion and the wall 18 is provided with vertically spaced exterior threads 20 and 21 the purpose of which will be later described.

Slidably disposed in the neck portion 19 is a valve and stopper assembly 22 which may well comprise a substantially cylindrically hollow body 23 closed at the lower end by a bottom wall 24 and open at the upper end. A sleeve 25 surrounds the body 23 and an annular flange 26 on the upper end of the body 23 and this sleeve 25 slidably engages the inner surface of the neck portion 19 to provide a fluid tight stopper. A stem 27 is secured to the bottom wall 24 of the body 23 and the stem 27 projects downwardly from within the upper compartment 13 and is provided on the lower end thereof with a diaphragm piercing head 28. The head 28 is provided with a substantially cylindrical outer surface 29 and a substantially conical lower end 30. A plurality of bores 31 extend axially through the head 28 and as shown in Fig. 9 the walls 32 between the bores 31 are beveled at their lower ends to provide inclined cutting edges 33.

A dispensing nipple 34 having conventional dispensing openings 35 therein is provided with a flange portion 36 engaging over the flange 26 of the body 23 in order to secure the nipple 34 thereto and the nipple 34 is also provided with an annular recess 37 adjacent the flange 36. A hollow inverted cup-shaped valve and stopper actuating member 38 is provided with an aperture 39 in the bottom wall 40, the nipple 34 projecting through such aperture 39 and with the inner edge of the bottom wall 40 received in the annular recess 37 in order to secure the actuating member 38 to the nipple 34 and valve and stopper assembly 22. The side wall 41 of the actuating member 38 is provided with internal threads 42 adjacent the lower end thereof and such internal threads 42 serve to threadedly engage the external threads 20 or 21 on the wall 18 of the upper compartment 13 in a manner to be presently described.

A nipple protecting cap 43 may be removably positioned on the member 38 and for this purpose there is provided an annular external flange 44 on the side wall 41 of the actuating member 38 and the flange 44 provides a shoulder 45 for limiting downward movement of the protecting cap 43.

In operation the lower compartment 12 of the container 11 is filled with a suitable diluent and the upper compartment 13 may be filled with milk in powdered or condensed form which when mixed with the diluent will provide a proper formula for feeding an infant or for any other desired use. It is, of course, understood that upon completion of the filling of the lower compartment 12 that the stopper and diaphragm 15 and 16 will be placed in position to seal the lower compartment 12 and after filling of the upper compartment 13 the valve and stopper assembly 22 is positioned with the sleeve 25 engaging the neck portion 19 and with the threads 42 on the wall 41 of the actuating member 38 engaging the threads 20 on the wall 18 of the upper compartment in order to hold the stopper assembly 22 in the position shown in Fig. 1. When it is desired to mix the contents of the containers 12 and 13 and dispense the same, it is only necessary to rotate the actuating member 38 in a manner to move the threads 42 downwardly out of engagement with threads 20 whereupon the actuating member 38 and assembly 22 may be moved downwardly to bring the conical lower end 30 of the piercing head 28 into engagement with the diaphragm 16 which will operate to pierce the same by the action of the cutting edges 33 to form a plurality of flaps which swing downwardly and outwardly as shown by the arrows in Fig. 1 to a position adjacent the wall of the restricted passage 14 and continued downward movement of the head 28 and actuating member 38 to bring the threads 42 into engagement with the threads 21 will result in the flaps formed by the piercing operation and shown at 46 in Fig. 2 being disposed between the outer surface 29 of the head 28 and the inner surface of the passage 14.

Communication between the compartments 12 and 13 is thus established by the bores 31 in the head 28 and the receptacle 10 may be manipulated in a manner to thoroughly mix the contents of both compartments. Likewise, as will be noted from an inspection of Fig. 2 downward movement of the valve and stopper assembly 22 results in bringing apertures 47 in the side wall of the body 23 into communication with the upper compartment 13 thereby permitting flow of the contents of the receptacle through the apertures 47, the interior of the body 23 and outwardly through the apertures 35 in the nipple 34. After the contents have been utilized the receptacle 10 may either be discarded or refilled by removing the stopper 15 and ruptured diaphragm 16 and replacing the same with a new imperforate stopper and diaphragm.

A modified form of the invention is shown in Figs. 3 and 4 in which a receptacle 48 is provided with a lower container 49 having a compartment 50 and an upper container 51 having a compartment 52. Containers 49 and 51 are connected by a reduced passage 53 which is closed by a rupturable diaphragm 54 integral with the material forming the receptacle 48. A bottom wall 55 is utilized to close the lower compartment 50 after filling of the same with a suitable diluent and the bottom wall 55 may be provided with a flange 56 which is sealed to the side wall 57 of the lower container 49 in any suitable manner.

The upper container 51 terminates at the upper end in a reduced neck portion 58 and slidably received in this neck portion is a valve and stopper assembly 59. This valve and stopper assembly 59 is substantially identical with the assembly described above in connection with Figs. 1 and 2 and may comprise a body 60 closed at the lower end by a bottom wall 61 and open at the upper end and provided with apertures 62 in the side wall thereof. An annular flange 63 is provided at the upper end of the body 60 and this flange serves to detachably receive and secure to the body 60 a dispensing nipple 64 provided with the usual dispensing opening 65.

Secured to the bottom wall 61 of the body 60 and projecting downwardly within the compartment 52 is a stem 66 to the lower end of which is attached a diaphragm piercing head 67 which is provided with a substantially cylindrical outer surface 68 and a substantially conical lower end 69. A plurality of bores 70 extend axially through the head 67 and the walls between these bores 70 are beveled as described above to provide inclined cutting edges.

A combination valve and stopper actuating member and nipple protecting cap 71 may well comprise an inverted cup-shaped shell having a skirt 72 received over the wall of the upper compartment 51 and the skirt 72 terminates in a reduced portion 73 receiving and protecting the nipple 64 and providing a shoulder 74 which engages the nipple 64 above the flange 63 on the body 60. In order to retain the actuating member 71 in position on the upper container 51 there is provided in the wall of the container 51 a vertically extending external groove 75 and intermediate the length thereof and intersecting the same a lateral groove 76. An inwardly extending lug 77 is provided on the skirt 72 adjacent the lower end thereof and the lug 77 may be disposed in the lateral groove 76 to prevent vertical movement of the actuating member 71 with the result that the valve and stopper assembly 59 will maintain the position shown in Fig. 3.

Assuming that the compartments 50 and 52 are filled with suitable materials and it is desired to mix and dispense the same it is only necessary to rotate the actuating member 71 to bring the lug 77 into registry with the vertical groove 75 at which time the actuating member 71 may be moved downwardly to force the valve and stopper assembly 60 and the diaphragm piercing head 67 downwardly to bring the conical end 69 of the head 67 into engagement with the diaphragm 54 thereby rupturing the same to provide a plurality of flaps 78 which as shown in Fig. 4 will be positioned between the outer surface 68 of the head 67 and the inner surface of the passage 53 between the compartments 50 and 52. This downward movement of the valve and stopper assembly 60 and the head 67 will result in providing communication between compartments 50 and 52 through the bores 70 and at the same time will bring the apertures 62 in the body 60 into communication with the upper compartment 52 to permit dispensing of the contents thereof through the apertures 62, the nipple 64 and the dispensing aperture 65 therein. Prior to such dispensing operation the actuating member 72 and nipple protecting cap 73 is, of course, removed by pulling the same upwardly with the lug 77 moving upwardly in the vertical groove 75 until the same disengages therefrom at the upper end.

A still further modified form of the invention is shown in Figs. 5 and 6 in which there is provided a compartmental receptacle 79 having a lower container 80 providing a lower compartment 81 and an upper container 82 providing an upper compartment 83. Compartments 81 and 83 are connected by a reduced passage 84 which is normally closed by a rupturable diaphragm 85 integral with the material of the receptacle 79.

The upper container 82 terminates at the upper end thereof in a substantially cylindrical reduced neck portion 86 and slidably received within this neck portion is a valve and stopper assembly 87 which may include a hollow body 88 closed at the lower end by a bottom wall 89 and open at the upper end. Apertures 90 are provided in the side wall of the body 88 and an annular flange 91 is provided at the upper end of the body 88 for detachably securing a nipple 92 thereto. Spaced below the flange 91 is a second annular flange 93 and depending from such flange 93 in spaced relation to the wall of the body 88 is a skirt portion 94 which provides an annular recess 95 for receiving the neck portion 86 of the upper container 82. A nipple protecting cap 96 may be positioned over the nipple 92 with the lower end 97 thereof frictionally engaging the skirt portion 94 to retain the cap 96 thereon against inadvertent displacement.

Secured to the bottom wall 89 of the body 88 is a stem 98 which projects downwardly into the upper compartment 83 and terminates at the lower end in a diaphragm piercing head 99 having a substantially cylindrical outer surface 100 and a substantially conical lower end 101. Bores 102 extend axially through the head 99 and the walls between such bores are beveled to provide inclined cutting edges as fully described above.

With the parts in the position shown in Fig. 5 the compartments 81 and 83 are sealed to retain and protect the contents thereof and when it is desired to mix such contents to dispense the same, the valve and stopper assembly 87 is moved to the position shown in Fig. 6 at which time the neck portion 86 will move into the annular recess 95 in the valve and stopper assembly 87 and the conical end of 101 of the piercing head 99 will engage and pierce the diaphragm 85 to provide flaps 103 which are disposed between the cylindrical outer surface 100 of the head 99 and the inner surface of the passage 84 between the compartments 81 and 83. The bores 102 in the head 99 provide communication between the compartments 81 and 83 and permit mixing of the contents thereof and a downward movement of the valve and stopper assembly 87 moves the apertures 90 into communication with the upper compartment 83 thereby permitting dispensing of the contents of the receptacle 79 through the apertures 90, the interior of the body 88 and the nipple 92.

Figs. 7 and 8 show a slightly further modified form of the invention in which a compartmental receptacle 104 is provided with a lower container 105 providing a lower compartment 106 and an upper container 107 providing an upper compartment 108. Compartments 106 and 108 are connected by a reduced passage 109 which is normally closed by a rupturable diaphragm 110. The diaphragm 110 may be integral with the material of the receptacle 104. In this form of the invention the outer wall of the upper container 107 is substantially cylindrical and is not reduced at the upper end to provide a neck portion as in the above described forms of the invention.

A valve and stopper assembly 112 is provided with a substantially cylindrical body 113 closed at the lower end by a bottom wall 114 and open at the upper end. The bottom wall 114 is provided with a plurality of apertures 115. An annular flange 116 is provided on the upper end of the body 113 and this flange serves to detachably receive a nipple 117.

Spaced below the flange 116 is a second flange 118 and depending therefrom in spaced relation to the body 113 is a skirt portion 119 which provides an annular recess 120 for receiving the side wall of the upper container 107. A suitable nipple protecting cap may be provided if desired and such cap may take the form of that shown in Fig. 5 but for convenience in illustration such cap is omitted from Fig. 7.

With the parts in the positions shown in Fig. 7 it is assumed that the lower compartment 106 and upper compartment 108 are filled with the desired materials and in order to permit mixing and dispensing of the same it is only necessary to move valve and stopper assembly 112 downwardly with the side wall of the upper container 107 entering the annular recess 120 to bring the conical lower end 121 of the diaphragm piercing head 122 into engagement with the diaphragm 110 thereby piercing the same to provide flaps 123 as shown in Fig. 8 disposed between the outer surface of the head 122 and the inner surface of the passage 109. Bores 124 in the head 122 provide communication between the lower compartment 106 and the upper compartment 108 to permit mixing of the contents thereof and the apertures 115 in the bottom wall 114 of the body 113 communicate with the upper compartment 108 and permit dispensing of the contents of the receptacle 104 through the nipple 117.

It will be seen by the above described invention there have been provided several forms of a relatively simple yet highly efficient compartmental receptacle which permits storage of materials such as infants' foods in a manner to fully protect the same against contamination and also to permit delaying the mixing of dry or condensed milk with a suitable diluent until it is desired to utilize the same which dispensing receptacle is completely self-contained and the operation thereof is relatively simple and does not require the removal of stoppers or other parts. Only a simple manipulative operation is required to pierce the diaphragm separating the two compartments of the receptacle in order to permit mixing of the contents and this same single manipulative operation also provides communication between the compartments and a dispensing nipple which permits dispensing of the contents as soon as the same have been suitably mixed. The receptacle of this invention may of course be made of suitable materials to permit sterilization thereof and the formation is such that the same may be economically molded in large quantities.

It will be obvious to those skilled in the arts that various changes may be made in the invention without departing from the spirit and scope thereof and therefore the invention is not limited by that which is shown in the drawing and described in the specification but only as indicated in the appended claims.

What is claimed is:

1. A compartmental dispensing receptacle comprising a container having a lower compartment and an upper compartment, a restricted passage between said compartments, a closure disposed in said passage and including a rupturable diaphragm, said container terminating at the upper end in a reduced cylindrical wall providing a neck portion, a valve and stopper assembly slidably disposed in said neck portion and comprising a substantially cylindrical hollow body closed at the lower end and open at the upper end, said body slidably engaging the wall of said neck portion to provide a fluid tight stopper, apertures in the wall of said body, a stem secured to the closed end of said body and projecting downwardly within said upper compartment, a diaphragm piercing head on the lower end of said stem, said head having a substantially cylindrical outer surface and a substantially conical lower end, bores extending axially through said head, the walls between said bores being beveled at their lower ends to provide inclined cutting edges, an annular flange on said body adjacent the upper end, a dispensing nipple removably secured to said flange, an annular recess in the wall of said nipple adjacent said flange, an inverted cup-shaped valve and stopper actuating member having an aperture in the bottom wall through which said nipple projects and with the inner edge of said bottom wall received in said annular recess to secure said member to said assembly, the side wall of said member having internal threads adjacent the lower end thereof, axially spaced external threads on the wall of said upper compartment and a nipple protecting cap removably received on said member whereby with the threads on said member engaging the upper threads on said container said stopper will close said neck portion and upon rotary and a downward movement of said member to disengage said upper threads and engage said lower threads said assembly will move downward to engage said cutting edges with said diaphragm to rupture same and form downwardly folded flaps disposed between the outer surface of said head and the wall of said passage, the bores in said head providing communication between said compartments to permit mixing of the contents, the downward movement of said assembly moving the apertures in said body into communication with said upper compartment to permit dispensing of the contents through said nipple.

2. A compartmental dispensing receptacle comprising a container having a lower compartment and an upper compartment, a restricted passage between said compartments, a closure disposed in said passage and including a rupturable diaphragm, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to the closed end of said body and projecting downwardly within said upper compartment, a diaphragm piercing head on the lower end of said stem, said head having a substantially conical lower end, bores extending axially through said head, the walls between said bores being beveled at the lower ends to provide inclined cutting edges, an annular flange on said body adjacent the upper end, a dispensing nipple removably secured to said flange, an annular recess in the wall of said nipple adjacent said flange, an inverted cup-shaped valve and stopper actuating member having an aperture in the bottom wall through which said nipple projects and with the inner edge of said bottom wall received in said annular recess to secure said member to said assembly, the side wall of said member having internal threads adjacent the lower end thereof, axially spaced external threads on the wall of said upper compartment and a nipple protecting cap removably received on said member whereby with the threads on said member engaging the upper threads on said container, said stopper will close said neck portion and upon rotary and downward movement of said member to disengage said upper threads and engage said lower threads said assembly will move downward to engage said cutting edges with said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment to permit dispensing of the contents through said nipple.

3. A compartmental dispensing receptacle comprising a container having a lower compartment and an upper compartment, a restricted passage between said compartments, a closure disposed in said passage and including a rupturable diaphragm, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to the closed end of said body and projecting downwardly within said upper compartment, a diaphragm piercing head on the lower end of said stem, said head having a substantially conical lower end, bores extending axially through said head, the walls between said bores being beveled at their lower ends to provide inclined cutting edges, a dispensing nipple removably secured to said body, an annular recess in the wall of said nipple, an inverted cup-shaped valve and stopper actuating member having an aperture in the bottom wall though which said nipple projects and with the inner edge of said bottom wall received in said annular recess to secure said member to said assembly, the side wall of said member having internal threads adjacent the lower end thereof, axially spaced external threads on the wall of said upper compartment and a nipple protecting cap removably received on said member whereby with the threads on said member engaging the upper threads on said container said stopper will close said neck portion and upon rotary and downward movement of said member to disengage said upper threads and engage said lower threads said assembly will move downward to engage said cutting edges with said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment to permit dispensing of the contents through said nipple.

4. A compartmental dispensing receptacle comprising a container having a lower compartment and an upper compartment, a restricted passage between said compartments, a closure disposed in said passage and including a rupturable diaphragm, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to the closed end of said body and projecting downwardly within said upper compartment, a diaphragm piercing head on the lower end of said stem, said head having a substantially conical lower end, bores extending axially through said head, the walls between said bores being beveled at their lower ends to provide inclined cutting edges, a dispensing nipple removably secured to said body, a hollow valve and stopper actuating member secured to said assembly, the side wall of said member having internal threads adjacent the lower end thereof, axially spaced external threads on the wall of said upper compartment and a nipple protecting cap removably received on said member whereby with the threads on said member engaging the upper threads on said container said stopper will close said neck portion and upon rotary and downward movement of said member to disengage said upper threads and engage said lower threads said assembly will move downward to engage said cutting edges with said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment to permit dispensing of the contents through said nipple.

5. A compartmental dispensing receptacle comprising a container having a lower compartment and an upper compartment, a restricted passage between said compartments, a closure disposed in said passage and including a rupturable diaphragm, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, said head having a substantially conical lower end, bores extending axially through said head, the walls between said bores being beveled at their lower ends to provide inclined cutting edges, a dispensing nipple removably secured to said body, a hollow valve and stopper actuating member secured to said assembly, the side wall of said member having internal threads adjacent the lower end thereof, and axially spaced external threads on the wall of said upper compartment whereby with the threads on said member engaging the upper threads on said container said stopper will close said neck portion and upon rotary and downward movement of said member to disengage said upper threads and engage said lower threads said assembly will move downward to engage said cutting edges with said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment to permit dispensing of the contents through said nipple.

6. A compartmental dispensing receptacle comprising a container having a lower compartment and an upper compartment, a restricted passage between said compartments, a closure disposed in said passage and including a rupturable diaphragm, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, bores extending axially through said head, a dispensing nipple removably secured to said body, a hollow valve and stopper actuating member secured to said assembly, the side wall of said member having internal threads adjacent the lower end thereof, and axially spaced external threads on the wall of said upper compartment whereby with the threads on said member engaging the upper threads on said container said stopper will close said neck portion and upon rotary and downward movement of said member to disengage said upper threads and engage said lower threads said assembly will move downward to engage said head with said diaphragm to rupture the same, the bores in said head providing communication between said compartments to permit mixing of the contents, the downward movement of said assembly moving the apertures in said body into communication with said upper compartment to permit dispensing of the contents through said nipple.

7. A compartmental dispensing receptacle comprising a container having a lower compartment and an upper compartment, a restricted passage between said compartments, a rupturable diaphragm closing said passage, said container terminating at the upper end in a reduced cylindrical wall providing a neck portion, a valve and stopper assembly slidably disposed in said neck portion and comprising a substantially cylindrical hollow body closed at the lower end and open at the upper end, said body slidably engaging the wall of said neck portion to provide a fluid tight stopper, apertures in the wall of said body, a stem secured to the closed end of said body and projecting downwardly within said upper compartment, a diaphragm piercing head on the lower end of said stem, said head having a substantially cylindrical outer surface and a substantially conical lower end, bores extending axially through said head, the walls between said bores being beveled at their lower ends to provide inclined cutting edges, an annular flange on said body adjacent the upper end, a dispensing nipple removably secured to said flange, a combination valve and stopper actuating member and nipple protecting cap comprising an inverted cup-shaped shell having a skirt portion received over the wall of said upper compartment, said skirt portion terminating in a reduced portion receiving said nipple and providing a shoulder for engaging said nipple above said flange, a vertical external groove in the wall of said upper compartment, a lateral groove intersecting said vertical groove intermediate the length thereof and an inwardly extending lug on said skirt adjacent the lower end thereof engageable in said lateral groove to retain said member on said container and movable into said vertical groove to permit axial movement and removal of said member whereby upon movement of said member and assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby upon removal of said member the contents of said container may be dispensed through said nipple.

8. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, said head having a substantially conical lower end, bores extending axially through said head, the walls between said bores being beveled at their lower ends to provide inclined cutting edges, an annular flange on said body adjacent the upper end, a dispensing nipple removably secured to said flange, a combination valve and stopper actuating member and nipple protecting cap comprising an inverted cup-shaped shell having a skirt portion received over the wall of said upper compartment, said skirt portion terminating in a reduced portion receiving said nipple and providing a shoulder for engaging said nipple above said flange, a vertical external groove in the wall of said upper compartment, a lateral groove intersecting said vertical groove intermediate the length thereof and an inwardly extending lug on said skirt adjacent the lower end thereof engageable in said lateral groove to retain said member on said container and movable into said vertical groove to permit axial movement and removal of said member whereby upon movement of said member and assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby upon removal of said member the contents of said container may be dispensed through said nipple.

9. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, said head having a substantially conical lower end, bores extending axially through said head, the walls between said bores being beveled at their lower ends to provide inclined cutting edges, a dispensing nipple removably secured to said body, a combination valve and stopper actuating member and nipple protecting cap comprising an inverted cup-shaped shell having a skirt portion received over the wall of said upper compartment, said skirt portion terminating in a reduced portion receiving said nipple and providing a shoulder for engaging said nipple, a vertical external groove in the wall of said upper compartment, a lateral groove intersecting said vertical groove intermediate the length thereof and an inwardly extending lug on said skirt adjacent the lower end thereof engageable in said lateral groove to retain said member on said container and movable into said vertical groove to permit axial movement and removal of said member whereby upon movement of said member and assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby upon removal of said member the contents of said container may be dispensed through said nipple.

10. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, said head having a substantially conical lower end, bores extending axially through said head, a dispensing nipple removably secured to said body, a combination valve and stopper actuating member and nipple protecting cap comprising an inverted shell having a skirt portion received over the wall of said upper compartment, said skirt portion terminating in a reduced portion receiving said nipple and providing a shoulder for engaging said nipple, a vertical external groove in the wall of said upper compartment, a lateral groove intersecting said vertical groove intermediate the length thereof and an inwardly extending lug on said skirt engageable in said lateral groove to retain said member on said container and movable into said vertical groove to permit axial movement and removal of said member whereby upon movement of said member and assembly downwardly said head will engage said diaphragm to rupture the same, the bores in said head providing communication between said compartments to permit mixing of the contents, the downward movement of said assembly moving the apertures in said body into communication with said upper compartment whereby upon removal of said member the contents of said container may be dispensed through said nipple.

11. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, bores extending axially through said head, a dispensing nipple removably secured to said body, a combination valve and stopper actuating member and nipple protecting cap comprising an inverted shell having a skirt portion received over the wall of said upper compartment, said skirt portion terminating in a reduced portion receiving said nipple and providing a shoulder for engaging said nipple, a vertical external groove in the wall of said upper compartment, a lateral groove intersecting said vertical groove intermediate the length thereof and an inwardly extending lug on said skirt engageable in said lateral groove to retain said member on said container and movable into said vertical groove to permit axial movement and removal of said member whereby upon movement of said member and assembly downwardly said head will engage said diaphragm to rupture the same, the bores in said head providing communication between said compartments to permit mixing of the contents, the downward movement of said assembly moving the apertures in said body into communication with said upper compartment whereby upon removal of said member the contents of said container may be dispensed through said nipple.

12. A compartmental dispensing receptacle comprising a container having a lower compartment and an upper compartment, a restricted passage between said compartments, a rupturable diaphragm closing said passage, said container terminating at the upper end in a reduced cylindrical wall providing a neck portion, a valve and stopper assembly slidably disposed in said neck portion and comprising a substantially cylindrically hollow body closed at the lower end and open at the upper end, said body slidably engaging the wall of said neck portion to provide a fluidtight stopper, apertures in the wall of said body, a stem secured to the closed end of said body and projecting downwardly within said upper compartment, a diaphragm piercing head on the lower end of said stem, said head having a substantially cylindrical outer surface and a substantially conical lower end, bores extending axially through said head, the walls between said bores being beveled at the lower ends to provide inclined cutting edges, an annular flange on said body adjacent the upper end, a dispensing nipple removably secured to said flange, a second annular flange on said body below said first flange, a skirt depending from said second flange and providing with said body a cylindrical recess slidably receiving the wall of said neck portion and a nipple protecting cap removably received on said skirt whereby upon movement of said assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby the contents of said container may be dispensed through said nipple.

13. A compartmental dispensing receptacle comprising a container having a lower compartment and an upper compartment, a restricted passage between said compartments, a rupturable diaphragm closing said passage, said container terminating at the upper end in a reduced cylindrical wall providing a neck portion, a valve and stopper assembly slidably disposed in said neck portion and comprising a substantially cylindrically hollow body closed at the lower end and open at the upper end, said body slidably engaging the wall of said neck portion to provide a fluidtight stopper, apertures in the wall of said body, a stem secured to the closed end of said body and projecting downwardly within said upper compartment, a diaphragm piercing head on the lower end of said stem, said head having a substantially cylindrical outer surface and a substantially conical lower end, bores extending axially through said head, the walls between said bores being beveled at the lower ends to provide inclined cutting edges, an annular flange on said body adjacent the upper end, a dispensing nipple removably secured to said flange, a second annular flange on said body below said first flange and a skirt depending from said second flange and providing with said body a cylindrical recess slidably receiving the wall of said neck portion whereby upon movement of said assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby the contents of said container may be dispensed through said nipple.

14. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, said head having a substantially conical lower end, bores extending axially through said head, the walls between said bores being beveled at the lower ends to provide inclined cutting edges, an annular flange on said body adjacent the upper end, a dispensing nipple removably secured to said flange, a second annular flange on said body below said first flange, and a skirt depending from said second flange and providing with said body a recess slidably receiving the wall of said neck portion whereby upon movement of said assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby the contents of said container may be dispensed through said nipple.

15. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, said head having a substantially conical lower end, bores extending axially through said head, the walls between said bores being beveled at their lower ends to provide inclined cutting edges, a dispensing nipple removably secured to said body, an annular flange on said body and a skirt depending from said flange and providing with said body a recess slidably receiving the wall of said neck portion whereby upon movement of said assembly downwardly said cutting edges will engage said diaphragm to rupture the same and form downwardly folded flaps disposed between the outer surface of said head and the wall of said passage, the bores in said head providing communication between said compartments to permit mixing of the contents, the downward movement of said assembly moving the apertures in said body into communication with said upper compartment whereby the contacts of said container may be dispensed through said nipple.

16. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluidtight stopper, apertures in the wall of said body, a stem secured to said body and projecting downwardly within said upper compartment, a diaphragm piercing head on the lower end of said stem, said head having a substantially conical lower end, bores extending axially through said head, a dispensing nipple removably secured to said body, an annular flange on said body and a skirt depending from said flange and providing with said body a recess slidably receiving the wall of said neck portion whereby upon movement of said assembly downwardly said head will engage said diaphragm to rupture the same, the bores in said head providing communication between said compartments to permit mixing of the contents, the downward movement of said assembly moving the apertures in said body into communication with said upper compartment whereby the contents of said container may be dispensed through said nipple.

17. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, bores extending axially through said head, a dispensing nipple removably secured to said body, an annular flange on said body and a skirt depending from said flange and providing with said body a recess slidably receiving the wall of said neck portion whereby upon movement of said assembly downwardly said head will engage said diaphragm to rupture the same, the bores in said head providing communication between said compartments to permit mixing of the contents, the downward movement of said assembly moving the apertures in said body into communication with said upper compartment whereby the contents of said container may be dispensed through said nipple.

18. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, bores extending axially through said head, a dispensing nipple removably secured to said body, a hollow valve and stopper actuating member secured to said assembly, the side wall of said member having internal threads adjacent the lower end thereof, and axially spaced external threads on the wall of said upper compartment whereby with the threads on said member engaging the upper threads on said container, said stopper will close said neck portion and upon rotary and downward movement of said member to disengage said upper threads and engage said lower threads said assembly will move downward to engage said head with said diaphragm to rupture the same, the bores in said head providing communication between said compartments to permit mixing of the contents, the downward movement of said assembly moving the apertures in said body into communication with said upper compartment to permit dispensing of the contents through said nipple.

19. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, bores extending axially through said head, a dispensing nipple removably secured to said body, a hollow valve and stopper actuating member engaging said assembly, the sidewall of said member being disposed over the sidewall of said upper compartment, inter-engaging means on said member and the sidewall of said upper compartment to prevent inadvertent downward movement of said member and assembly whereby upon release of said inter-engaging means said member may be moved downwardly to move said assembly downwardly to engage said head with said diaphragm to rupture the same, the bores in said head providing communication between said compartments to permit mixing of the contents, the downward movement of said assembly moving the apertures in said body into communication with said upper compartment to permit dispensing of the contents through said nipple.

20. A compartmental dispensing receptacle comprising a container having a lower compartment and an upper compartment, a restricted passage between said compartments, a rupturable diaphragm closing said passage, said container terminating at the upper end in a reduced neck portion, a valve and stopper assembly slidably disposed in said neck portion and comprising a hollow body closed at the lower end and open at the upper end, said body slidably engaging the wall of said neck portion to provide a fluid tight stopper, apertures in the wall of said body, a stem secured to said body and projecting downwardly within said upper compartment, a diaphragm piercing head on the lower end of said stem, bores extending axially through said head and a dispensing nipple removably secured to said body whereby upon downward movement of said assembly said head will engage said diaphragm to rupture the same, the bores in said head providing communication between said compartments to permit mixing of the contents, the downward movement of said assembly moving the apertures in said body into communication with said upper compartment to permit dispensing of the contents through said nipple.

References Cited in the file of this patent
UNITED STATES PATENTS

| | | |
|---|---|---|
| 1,644,821 | Eckart | Oct. 11, 1927 |
| 2,410,310 | Smith | Oct. 29, 1946 |
| 2,487,236 | Greenberg | Nov. 8, 1949 |
| 2,557,120 | Knoblock | June 19, 1951 |
| 2,653,611 | Smith | Sept. 29, 1953 |
| 2,659,370 | Smith | Nov. 17, 1953 |
| 2,721,552 | Nosik | Oct. 25, 1955 |